(12) United States Patent
Gitt et al.

(10) Patent No.: US 11,293,526 B2
(45) Date of Patent: Apr. 5, 2022

(54) HYBRID DUAL-CLUTCH TRANSMISSION

(71) Applicant: DAIMLER AG, Stuttgart (DE)

(72) Inventors: Carsten Gitt, Stuttgart (DE); Tobias Haerter, Stuttgart (DE); Peter Hahn, Stuttgart (DE); Andreas Kolb, Wernau (DE); Jakub Romaniak, Stuttgart (DE); Juergen Schweitzer, Filderstadt (DE); Stefan Sperrfechter, Donzdorf (DE); Jonathan Zeibig, Remshalden (DE)

(73) Assignee: DAIMLER AG, Stuttgart (DE)

( * ) Notice: Subject to any disclaimer, the term of this patent is extended or adjusted under 35 U.S.C. 154(b) by 161 days.

(21) Appl. No.: 16/922,195

(22) Filed: Jul. 7, 2020

(65) Prior Publication Data

US 2021/0010567 A1 Jan. 14, 2021

(30) Foreign Application Priority Data

Jul. 8, 2019 (DE) .................. 10 2019 004 762.1

(51) Int. Cl.
*F16H 3/093* (2006.01)
*F16H 3/00* (2006.01)
(52) U.S. Cl.
CPC ............. *F16H 3/093* (2013.01); *F16H 3/006* (2013.01); *F16H 2200/0056* (2013.01); *F16H 2200/0086* (2013.01); *F16H 2200/2035* (2013.01)
(58) Field of Classification Search
CPC ................................. F16H 3/093; F16H 3/006

USPC ..................................................... 74/330, 331
See application file for complete search history.

(56) References Cited

U.S. PATENT DOCUMENTS

| 7,478,572 | B2 * | 1/2009 | Maten .................. F16H 61/688 74/331 |
| 8,323,142 | B2 * | 12/2012 | Masumoto .......... F16H 37/0833 475/221 |
| 10,066,701 | B2 * | 9/2018 | Gwon ...................... F16H 3/006 |
| 2007/0220999 | A1 * | 9/2007 | Hatori .................... F16H 3/097 74/330 |
| 2010/0257963 | A1 | 10/2010 | Rieger et al. |
| 2015/0285340 | A1 * | 10/2015 | Kim ........................ F16H 3/093 74/330 |

FOREIGN PATENT DOCUMENTS

| DE | 102009002353 A1 | 10/2010 |
| DE | 102013019120 A1 | 5/2015 |
| DE | 102013019121 A1 | 5/2015 |

* cited by examiner

*Primary Examiner* — Ha Dinh Ho
(74) *Attorney, Agent, or Firm* — Patent Portfolio Builders PLLC

(57) ABSTRACT

A hybrid dual-clutch transmission includes a first sub-transmission and a second sub-transmission, a first countershaft, a first output gear non-rotatably connected to the first countershaft, a second countershaft, a dual clutch, which has a first clutch assigned to the first sub-transmission and a second clutch assigned to the second sub-transmission, a separating clutch and an electric motor. The electric motor is or can be coupled to the separating clutch and to the dual clutch.

9 Claims, 7 Drawing Sheets

58a

Figure 1:
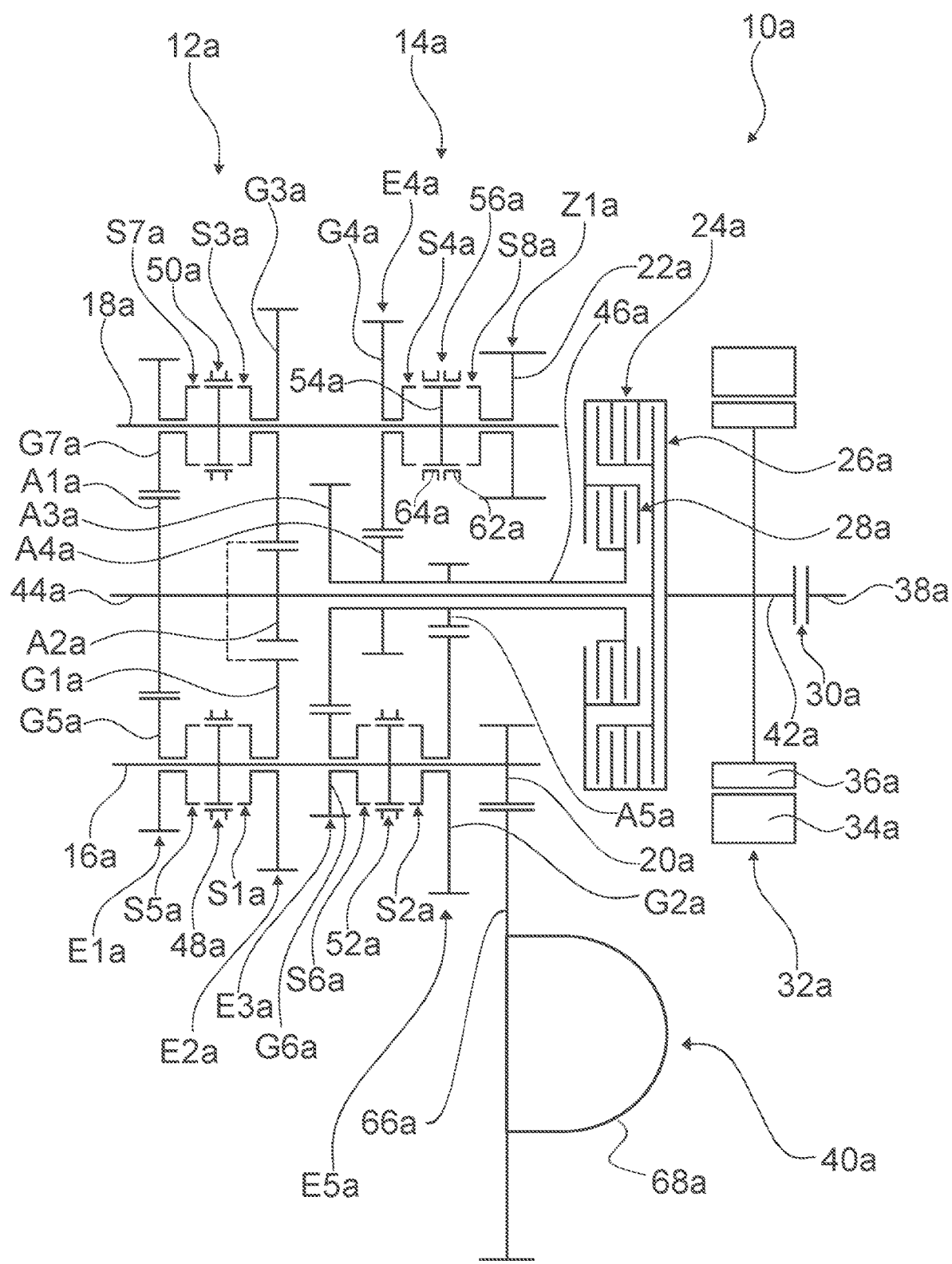

| | 26a | 28a | S1a | S2a | S3a | S4a | S5a | S6a | S7a | S8a |
|---|---|---|---|---|---|---|---|---|---|---|
| V1a | ● | | | ● | ● | ● | | | | |
| V2a | | ● | | ● | | | | | | |
| V3a | ● | | | | ● | | | | | ● |
| V4a | | ● | | | | ● | | | | ● |
| V5a | ● | | | | | | ● | | | |
| V6a | | ● | | | | | | ● | | |
| V7a | ● | | | | | | | | ● | ● |
| R1a | | ● | ● | | | ● | | | ● | |
| R2a | ● | | ● | | | | | | | |
| V8a | ● | | | | | ● | | ● | ● | |

Fig. 2

HYBRID DUAL-CLUTCH TRANSMISSION

CROSS-REFERENCE TO RELATED APPLICATIONS

This application claims priority under 35 U.S.C. § 119 to German Patent Application No. DE 10 2019 004 762.1, filed on Jul. 8, 2019, the entire disclosure of which is expressly incorporated by reference herein.

BACKGROUND AND SUMMARY OF THE INVENTION

Exemplary embodiments of the invention relate to a hybrid dual-clutch transmission.

By way of example, dual-clutch transmissions are already known from DE 10 2013 019 120 A1, DE 10 2009 002 353 A1 and the generic DE 10 2013 019 121 A1, on which hybrid dual-clutch transmissions can also be based.

Exemplary embodiments of the invention are directed to a hybrid dual-clutch transmission having a transmission part optimized for the purpose of hybridization with improved properties, in particular with respect to a compact design.

According to exemplary embodiments, a hybrid dual-clutch transmission has a first sub-transmission and a second sub-transmission, a first countershaft, a first output gear connected to the first countershaft in a rotationally fixed manner, a second countershaft, a second output gear rotatably mounted on the second countershaft, a dual clutch, which has a first clutch assigned to the first sub-transmission and a second clutch assigned to the second sub-transmission, a separating clutch, wherein a third gearwheel assigned to the first sub-transmission and a seventh gearwheel assigned to the first sub-transmission are arranged coaxially with the second countershaft, and wherein a first gearwheel assigned to the first sub-transmission is arranged coaxially with the first countershaft.

Here, the seventh gearwheel is arranged in a first wheel plane, and the third gearwheel is arranged in a second wheel plane.

Furthermore, an output switch element is provided to switch the second output gear. The output switch element is designed to couple or decouple the second output gear with the second countershaft in a rotationally fixed manner.

It is further provided that the second output gear has a larger diameter than the first output gear, and that the dual clutch, an output gear plane, a fifth wheel plane associated with a second forward gear, a fourth wheel plane associated with a fourth forward gear, a third wheel plane associated with a sixth forward gear, and the first sub-transmission are arranged one after the other in this order, as viewed in an axial direction.

It is further provided that the output switch element is arranged axially between the output gear plane and the fourth wheel plane and that, in order to form a reverse gear, a third gear wheel arranged coaxially with the second countershaft is arranged permanently meshing with a first gear wheel arranged coaxially with the first countershaft. Here, the third gearwheel preferably meshes with a second drive gear which is non-rotatably connected to a first input shaft of the first sub-transmission. The third gearwheel and the first gearwheel are preferably assigned to the first sub-transmission.

According to the invention, an electric motor is provided, wherein a rotor of the electric motor is or can be coupled to an output side of the separating clutch and to an input side of the dual clutch.

Furthermore, according to the invention, it is provided that a differential cage of an axle transmission is arranged at least partially axially overlapping with the dual clutch.

Due to the design according to the invention, the hybrid dual-clutch transmission can be provided in a particularly compact and at the same time very powerful way.

In particular, it has been shown that by the combination of the features of the axial arrangement of the dual clutch, the output gear plane, the forward gears 2, 4 and 6 assigned to the second sub-transmission, the first sub-transmission, the switchability of the larger of the two output gears, the axial arrangement of the output switch element and the arrangement of the differential cage an optimum compromise can be reached between the performance of a hybrid dual clutch transmission and a compact arrangement of the same.

In addition, the hybrid dual-clutch transmission, which has been optimized in this way and is in accordance with the invention, has the advantage that a reverse gear, which has a very short transmission, can be formed via the third gearwheel and the first gearwheel due to the output switch element and the special wheel pairing for the reverse gear. This reverse gear, which has a very short transmission, is formed advantageously starting from the fourth wheel plane (and thus from the second sub-transmission) associated with the fourth forward gear, further via the seventh gearwheel (and thus via the first sub-transmission), further via the third gear, the first gear and finally via the first output gear, wherein the second output gear is decoupled from the second countershaft by means of the output switch element.

In addition, the hybrid dual-clutch transmission according to the invention can also form a very large forward gear, i.e., a forward gear with a very small transmission ratio. The large forward gear can be formed as an eighth or ninth gear starting from the first sub-transmission via the seventh gearwheel, further via the fourth wheel plane assigned to the fourth forward gear, further via the third wheel plane assigned to the sixth forward gear and finally via the first output gear, wherein the second output gear is decoupled from the second countershaft by means of the output switch element.

The hybrid dual-clutch transmission is provided in particular for use in a vehicle, in particular a motor vehicle. Preferably, the vehicle comprises the hybrid dual-clutch transmission. The vehicle can be powered either by the electric motor or by an internal combustion engine of the vehicle. The vehicle is preferably designed as a plug-in hybrid vehicle (PHEV).

The separating clutch is provided to decouple the hybrid dual-clutch transmission from the internal combustion engine, in particular a crankshaft of the internal combustion engine, or to couple it to the crankshaft.

The term "provided" is to be understood as specially designed and/or equipped. The fact that an object is intended for a specific function should be understood to mean that the object fulfils and/or executes this specific function in at least one application and/or operating state.

The electric motor has a stator and a rotor. The stator is non-rotatably connected to a housing of the hybrid dual-clutch transmission. The rotor is or can be coupled to an input side of the dual clutch. The rotor is either arranged coaxially to the dual clutch or, particularly advantageously, axially offset to the dual clutch.

In the context of the invention, a rotationally fixed connection or a rotationally fixed coupling of two rotatably mounted elements should be understood to mean that the two elements are arranged coaxially to each other and are connected or coupled to each other in such a way that they rotate at the same angular velocity. A rotationally fixed connection of a rotatably mounted element to a housing is to be understood as the element being connected to the housing in such a way that it cannot be rotated relative to the housing.

The hybrid dual-clutch transmission has a transmission input shaft. The transmission input shaft is preferably designed as a solid shaft. Preferably the transmission input shaft is connected non-rotatably to an input side of the dual clutch and non-rotatably to an output side of the separating clutch. Preferably the electric motor, in particular the rotor of the electric motor, is or can be coupled to the transmission input shaft.

In particular, the transmission input shaft is arranged axially in parallel and axially offset to the first countershaft and the second countershaft. Preferably, the first countershaft is arranged axially in parallel and axially offset to the second countershaft. Preferably the first output gear is arranged on the first countershaft. Preferably, the first output gear is designed as a first final-drive wheel. Preferably, the first output gear is designed as a spur gear. The first output gear is preferably designed as a fixed gear.

Preferably the second output gear is arranged on the second countershaft. Preferably, the second output gear is designed as a second final-drive wheel. Preferably, the second output gear is designed as a spur gear. The second output gear is preferably designed as an idler wheel. If the second output gear is decoupled from the second countershaft, the second countershaft can be advantageously used as an intermediate shaft for at least one winding-path gear.

Preferably, the first sub-transmission is arranged on a side of the second sub-transmission facing away from the first output gear and the second output gear.

The term "axial" refers in particular to an axis of rotation of the transmission input shaft, wherein the term "axial" designates in particular a direction, namely the axial direction, which runs in parallel or coaxially with the axis of rotation of the transmission input shaft.

In the following, a "single wheel plane" is to be understood in particular as a gear plane in which exactly one gear wheel and exactly one drive gear of the first sub-transmission or the second sub-transmission are arranged, wherein the exactly one drive gear is arranged to mesh with the exactly one gear wheel. A "double wheel plane" is to be understood in particular as a plane in which exactly two gearwheels and exactly one drive gear of the first sub-transmission or the second sub-transmission are arranged, wherein the exactly one drive gear is arranged to mesh with the exactly two gearwheels in each case.

In an advantageous development, the first sub-transmission has exactly four switchable spur gear pairs, which are arranged in exactly two wheel planes designed as double wheel planes, the second sub-transmission has exactly three switchable spur gear pairs, which are arranged in three single wheel planes. Advantageously, the design allows a good compromise between a compact design of the hybrid dual-clutch transmission and high performance to be achieved. Advantageously, this design allows material savings and weight savings to be achieved. Despite a small number of components, this development can provide a high number of gears, namely up to 8 sensibly stepped forward gears and at least 2 sensibly usable reverse gears.

Furthermore, it is proposed that the hybrid dual-clutch transmission comprises exactly five gearwheel planes, which are formed by the two wheel planes designed as double wheel planes and the three single wheel planes. This design makes it possible to provide a hybrid dual-clutch transmission with advantageously few gearwheel planes. This enables an advantageously compact design. A "gearwheel plane" is to be understood in particular as a plane in which at least one spur gear pair is arranged, wherein the at least one spur gear pair is provided to provide a defined transmission ratio for at least one gear. Particularly preferably, the hybrid dual-clutch transmission comprises an output gear plane. Preferably, the exactly five gearwheel planes are formed by the first wheel plane, the second wheel plane, the third wheel plane, the fourth wheel plane and the fifth wheel plane. Preferably, the first output gear and the second output gear are arranged at least substantially on the output gear plane. In this context, the term "at least substantially" is to be understood in particular to mean that a deviation from a predetermined value is in particular less than 25%, preferably less than 10% and particular preferably less than 5% of the predetermined value.

It is also proposed that a fifth gearwheel of the first sub-transmission and the seventh gearwheel of the first sub-transmission are located in one of the wheel planes, which are, for example, designed as double wheel planes. This design allows an advantageously low number of gearwheel planes to be achieved. This allows an axially compact design of the hybrid dual-clutch transmission. Particularly preferably, the fifth gearwheel of the first sub-transmission and the seventh gearwheel of the first sub-transmission are arranged on the first wheel plane, which is preferably designed as a double wheel plane. Preferably, the fifth gearwheel is arranged on the first countershaft. Preferably, the fifth gearwheel is designed as a spur gear. The fifth gearwheel is designed in particular as an idler wheel. Preferably, the seventh gearwheel is designed as a spur gear. The seventh gearwheel is designed in particular as an idler wheel.

The first wheel plane is advantageously arranged on one axial end of a region of wheel planes.

Particularly preferably, a second gearwheel of the second sub-transmission is arranged on the fifth wheel plane. Preferably, the second gearwheel is arranged on the first countershaft. Preferably, the second gearwheel is designed as a spur gear. The second gearwheel is designed in particular as an idler wheel.

Particularly preferably, a fourth gearwheel of the second sub-transmission is arranged in the fourth wheel plane. Preferably, the fourth gearwheel is arranged on the second countershaft. Preferably, the fourth gearwheel is designed as a spur gear. The fourth gearwheel is designed in particular as an idler wheel.

Particularly preferably, a sixth gearwheel of the second sub-transmission is arranged on the third wheel plane. Preferably, the sixth gearwheel is arranged on the first countershaft. Preferably, the sixth gearwheel is designed as a spur gear. The sixth gearwheel is in particular designed as an idler wheel. Preferably, the second gearwheel is arranged axially between the first output gear and the fourth gearwheel. Preferably, the fourth gearwheel is arranged axially between the second gearwheel and the sixth gearwheel.

Furthermore, it is proposed that a gearwheel, in particular a reverse gearwheel, of the first sub-transmission is arranged to mesh with a third gearwheel of the first sub-transmission. Due to this design, additional gears for setting a defined direction of rotation for a reverse gear can advantageously be dispensed with. This advantageously allows a compact design of the hybrid dual-clutch transmission. Particularly preferably, the gearwheel, in particular the reverse gearwheel, of the first sub-transmission and the third gearwheel of the first sub-transmission are arranged on the second wheel plane. Preferably, the gearwheel, in particular the reverse gearwheel, is arranged on the first countershaft. Preferably, the gearwheel, in particular the reverse gearwheel, is designed as a spur gear. The gearwheel, in particular the reverse gearwheel, is designed in particular as an idler wheel. Preferably, the third gearwheel is arranged on the second countershaft. Preferably, the third gearwheel is designed as a spur gear. The third gearwheel is in particular designed as an idler wheel.

The electric motor can be arranged coaxially with the first input shaft of the first sub-transmission and the second input shaft of the second sub-transmission. Due to this design, complex components for a torque transmission can advantageously be dispensed with.

Particularly advantageously, the electric motor is arranged axially in parallel and axially offset to the transmission input shaft. Here, the electric motor can be connected to the transmission input shaft by means of at least one further spur gear pair or by means of at least one chain drive. Although this requires more components, it results, together with the features according to the invention, in an overall very compact arrangement.

Preferably, the first input shaft is arranged coaxially with the second input shaft. The first input shaft is preferably designed as a solid shaft. Particularly preferably, the second input shaft is designed as a hollow shaft. Preferably, the first input shaft is arranged axially in parallel and axially offset to the first countershaft and the second countershaft. Preferably, the first input shaft is connected non-rotatably to an output side of the first clutch. Preferably, the first input shaft can be coupled non-rotatably to the transmission input shaft by means of the first clutch. Preferably, the second input shaft is connected non-rotatably to an output side of the second clutch. Preferably, the second input shaft can be coupled non-rotatably to the transmission input shaft by means of the second clutch.

It is also proposed that the first sub-transmission comprises exactly four switch elements. Due to this design, an advantageous switching of gears can be achieved. The first sub-transmission comprises in particular a first switch element, a third switch element, a fifth switch element and a seventh switch element. The first switch element is in particular provided to switch the reverse gearwheel. The third switch element is in particular provided to switch the third gearwheel. The fifth switch element is in particular provided to switch the fifth gearwheel. The seventh switch element is in particular provided to switch the seventh gearwheel. Preferably, the exactly four switch elements of the first sub-transmission form two double switch elements. Preferably, the first switch element and the fifth switch element form a first double switch element. The first double switch element is preferably arranged axially between the two wheel planes designed as double wheel planes. Preferably, the first double switch element is provided to switch either the gearwheel, in particular the reverse gearwheel, or the fifth gearwheel. The first double switch element is in particular provided to be actuated by a first shift fork of the first sub-transmission. Preferably, the third switch element and the seventh switch element form a second double switch element. The second double switch element is preferably arranged axially between the two wheel planes designed as double wheel planes. Preferably, the second double switch element is provided to switch either the third gearwheel or the seventh gearwheel. The second double switch element is provided in particular to be actuated by a second shift fork of the first sub-transmission.

In addition, it is proposed that the second sub-transmission comprises exactly three switch elements. Due to this design, an advantageous switching of gears can be achieved. The second sub-transmission comprises in particular a second switch element, a fourth switch element and a sixth switch element. The second switch element is provided in particular to switch the second gearwheel. The fourth switch element is provided in particular to switch the fourth gearwheel. The sixth switch element is provided in particular to switch the sixth gearwheel. Preferably, the second switch element and the sixth switch element form a third double switch element. The third double switch element is preferably arranged axially between the third wheel plane and the fifth wheel plane. Preferably, the third double switch element is provided to switch either the second gearwheel or the sixth gearwheel. The third double switch element is provided in particular to be actuated by a third shift fork of the second sub-transmission.

Particularly preferably, the hybrid dual-clutch transmission comprises exactly eight switch elements in total, in particular the exactly four switch elements of the first sub-transmission, the exactly three switch elements of the second sub-transmission and the output switch element.

It is also proposed that an axial extension of a toothing of the second output gear is substantially smaller than an axial extension of a toothing of the first output gear. Gears in transmissions are always dimensioned as light or as small as possible. In connection with the features according to the invention, such a weaker dimensioning of the second output gear is possible and particularly advantageous, because it can at least partially compensate for an axial extension of the hybrid dual-clutch transmission resulting from the presence of the output switch element.

Furthermore, it is proposed that the second sub-transmission has a synchronizer body coupled to a switch element of the second sub-transmission and to the output switch element. Due to this design, one synchronizer body can advantageously be used for two switch elements. In this way, material savings and weight savings can advantageously be achieved. The synchronizer body is in particular designed as a ganging body. Preferably, the synchronizer body is non-rotatably connected to the second countershaft. The synchronizer body is preferably coupled to the fourth switch element and to the output switch element. Preferably, the synchronizer body can be coupled non-rotatably to the fourth gearwheel on the one hand and non-rotatably to the second output gearwheel on the other. Preferably, the output switch element and the fourth switch element form a fourth double switch element, wherein this fourth double switch element is advantageously actuated by two different, respectively independent actuators, unlike the other double switch elements. The fourth double switch element is preferably arranged axially between the fourth wheel plane and the output gear plane. Preferably, the fourth double switch element is provided to switch the fourth gearwheel and/or the second output gear independently of each other.

The fourth double switch element is in particular provided to be actuated by a fourth shift fork of the first sub-transmission and an output shift fork of the hybrid dual-clutch transmission. Preferably, the fourth shift element is coupled to the fourth shift fork. Preferably, the output switch element is coupled to the output shift fork. Particularly preferably, the fourth shift fork and the output shift fork can be actuated separately.

It is also proposed that a switch element of the second sub-transmission is arranged axially between the fourth gearwheel of the second sub-transmission and the third gearwheel of the first sub-transmission. Due to this design, an installation space between two axially adjacent gearwheels can advantageously be made use of. Particularly preferably, the fourth switch element of the second sub-transmission is preferably arranged axially between the fourth gearwheel of the second sub-transmission and the third gearwheel of the first sub-transmission. In this way, the fourth switch element and the output switch element do not form a double switch element. Preferably, the fourth switch element is arranged at least substantially on the third wheel plane. Advantageously, an outer diameter of a first sliding sleeve of the output switch element is smaller than a root diameter of the second output gear. In this way, a region of the output gear plane and the differential cage can be executed to save axial space.

A further advantageous design results from the fact that, in a neutral position, the first sliding sleeve is connected non-rotatably to the second output gear and is mounted on the second output gear in an axially displaceable manner. Advantageously, the second output gear has a short hollow shaft, which is connected non-rotatably to a toothing of the second output gear, wherein the first sliding sleeve is mounted in an axially displaceable manner on this hollow shaft and radially surrounding this hollow shaft.

Particularly preferably, the first sliding sleeve is arranged at least partially axially overlapping a toothing of an input gearwheel of an axle transmission, whereby a compact structure can also be represented.

Further advantages arise from the following figure description. Four exemplary embodiments of the invention are depicted in the figures. The figures, the figure description and the claims contain numerous features in combination. The person skilled in the art will expediently also consider the features individually and combine them into meaningful further combinations.

BRIEF DESCRIPTION OF THE DRAWING FIGURES

Figure 3:
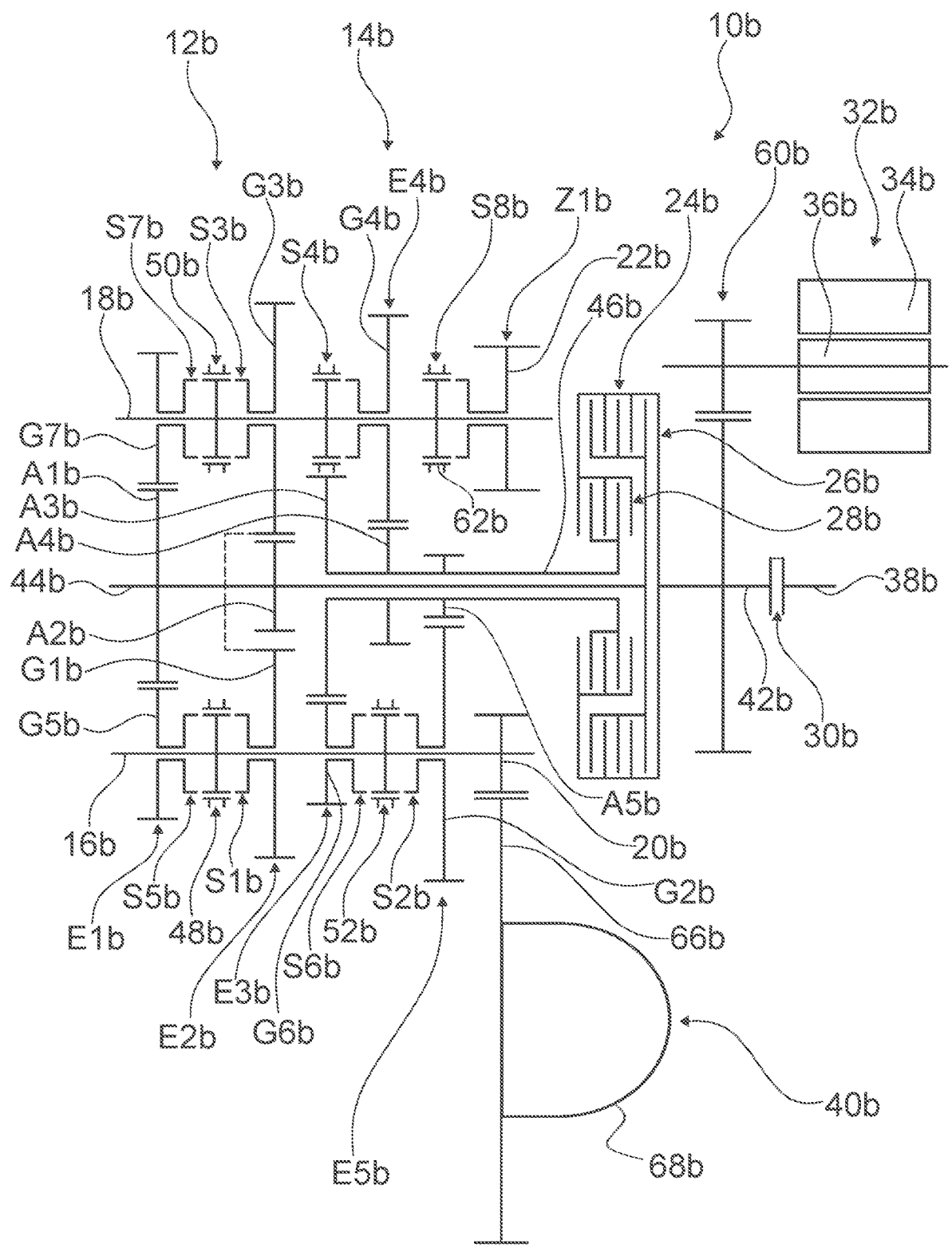
Figure 4:
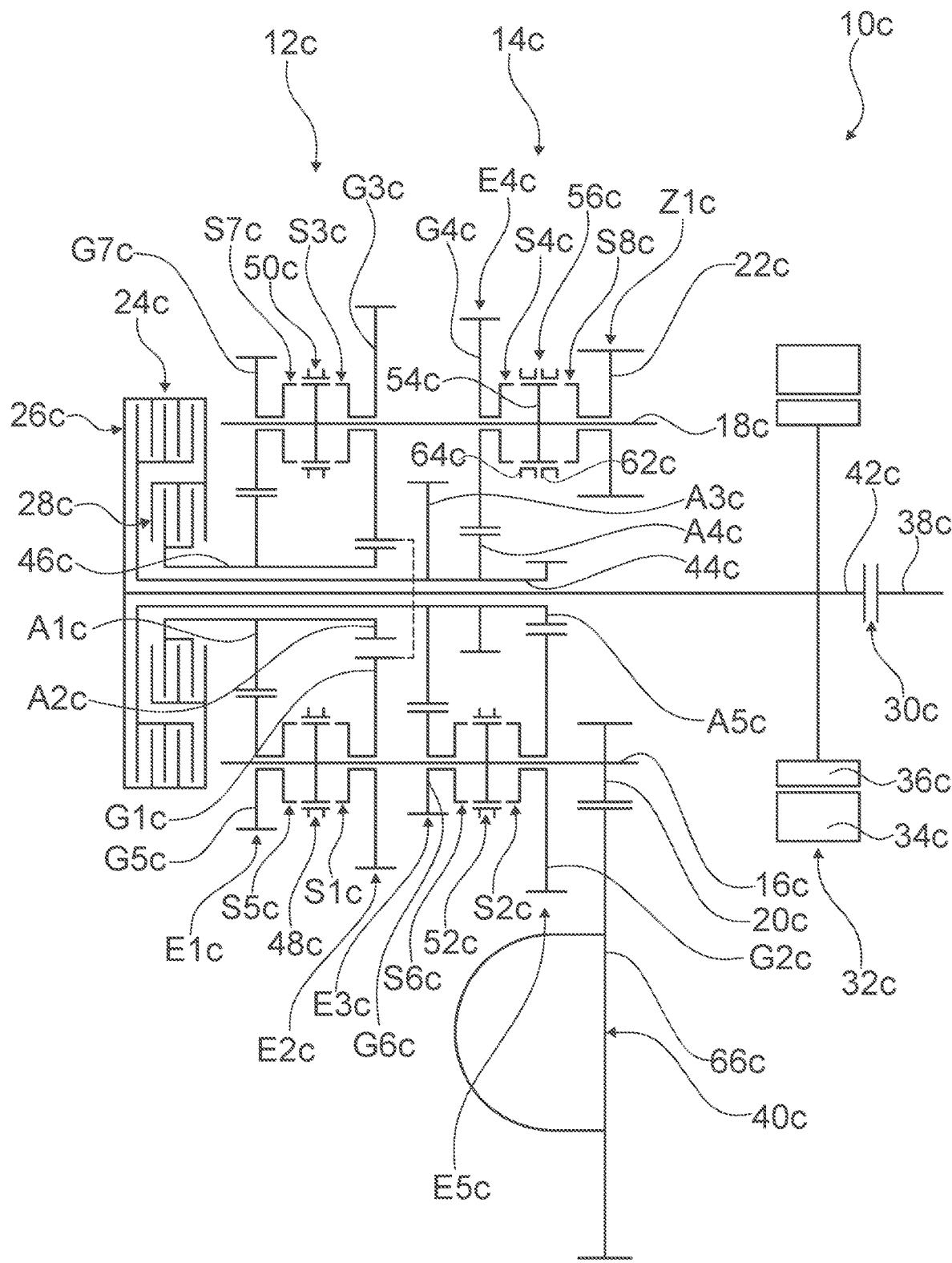
Figure 5:
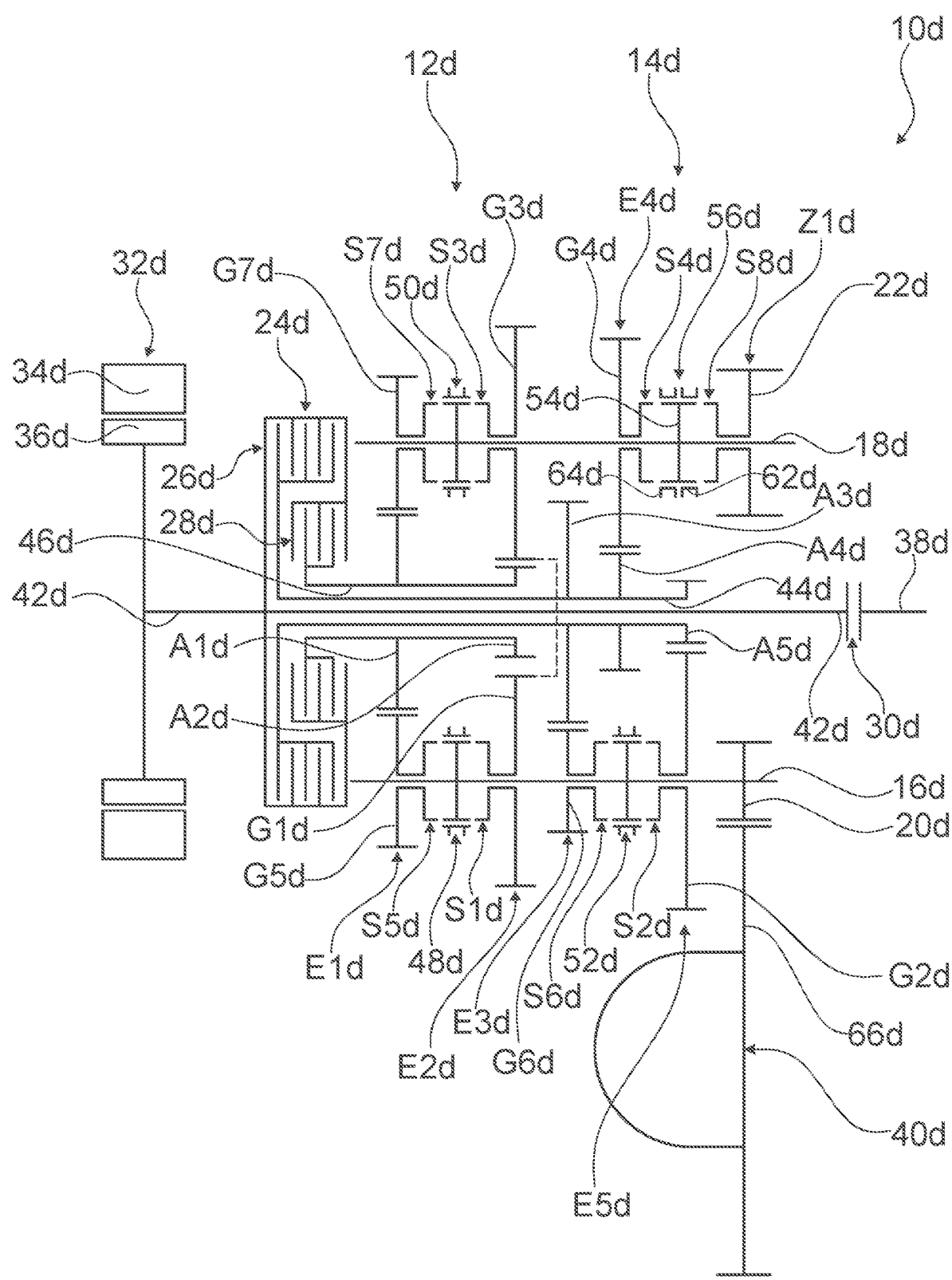
Figure 6:
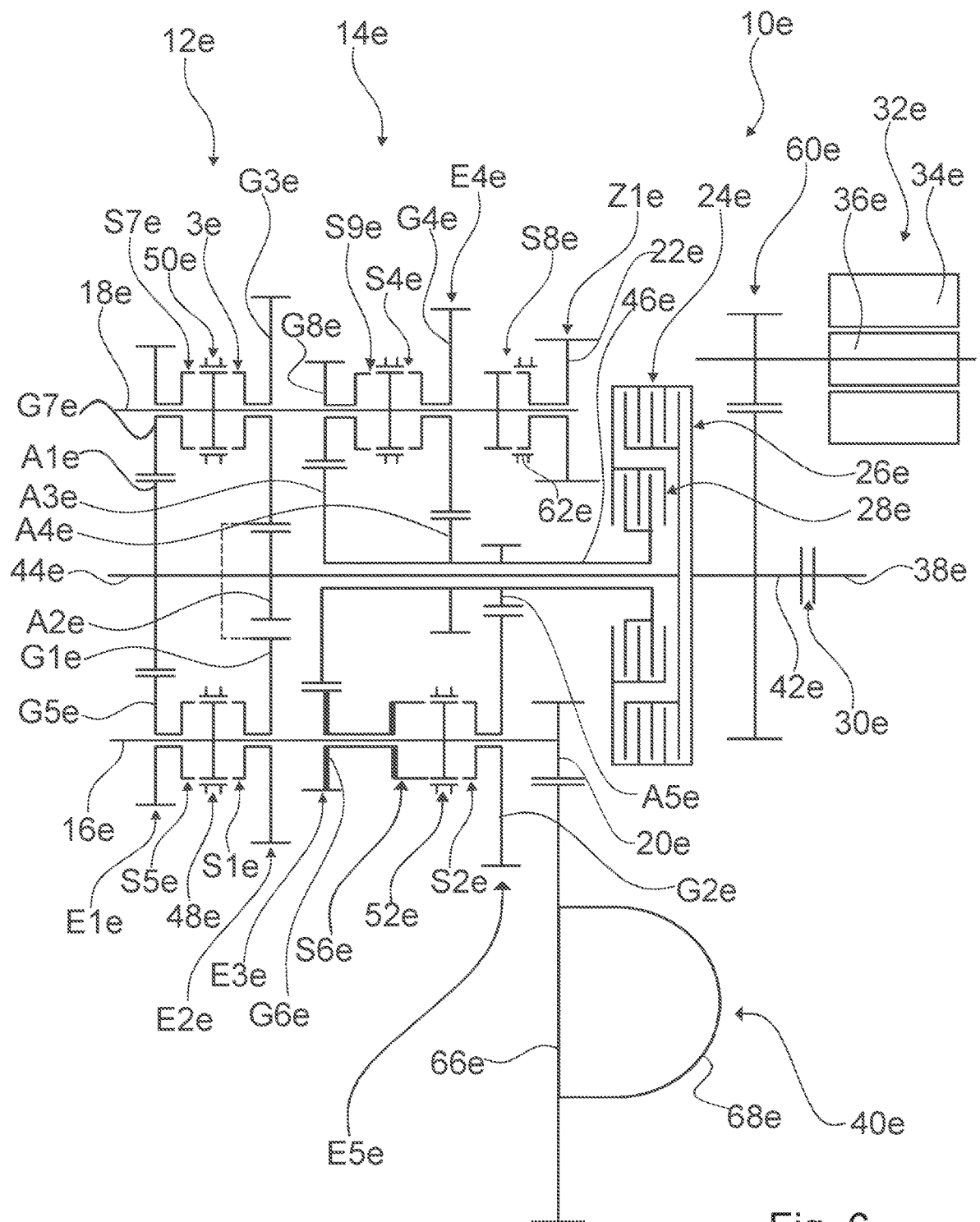
Figure 7:
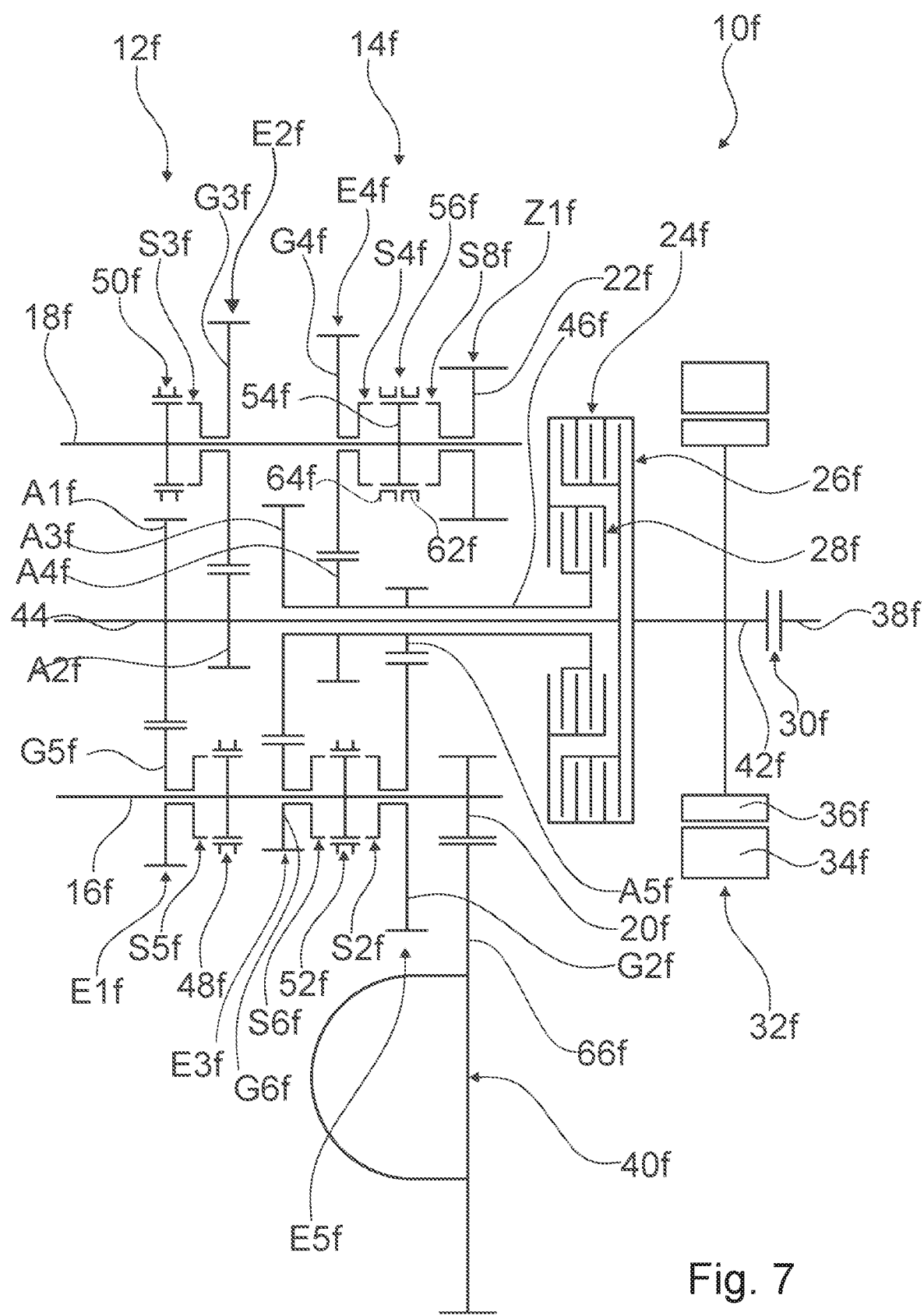

Here are shown:

FIG. 1 a schematic depiction of a hybrid dual-clutch transmission according to the invention in a first exemplary embodiment, FIG. 2 a circuit diagram of the hybrid dual-clutch transmission according to the invention in the first exemplary embodiment, FIG. 3 a schematic depiction of a hybrid dual-clutch transmission according to the invention in a second exemplary embodiment, FIG. 4 a schematic depiction of a hybrid dual-clutch transmission according to the invention in a third exemplary embodiment, FIG. 5 a schematic depiction of a hybrid dual-clutch transmission according to the invention in a fourth exemplary embodiment, FIG. 6 a schematic depiction of a hybrid dual-clutch transmission according to the invention in a fifth exemplary embodiment and FIG. 7 a schematic depiction of a hybrid dual-clutch transmission according to the invention in a sixth exemplary embodiment.

DETAILED DESCRIPTION

FIG. 1 shows a hybrid dual-clutch transmission 10a in a first exemplary embodiment. The hybrid dual-clutch transmission 10a comprises a first sub-transmission 12a and a second sub-transmission 14a. The hybrid dual-clutch transmission 10a comprises a first countershaft 16a. The hybrid dual-clutch transmission 10a comprises a second countershaft 18a. The first countershaft 16a is arranged axially in parallel and axially offset from the second countershaft 18a. The hybrid dual-clutch transmission 10a comprises a first output gear 20a non-rotatably connected to the first countershaft 16a. The first output gear 20a is arranged on the first countershaft 16a. The first output gear 20a is designed as a first final drive gear. The first output gear 20a is designed as a spur gear. The first output gear 20a is designed as a fixed gear. The hybrid dual-clutch transmission 10a comprises a second output gear 22a rotatably mounted on the second countershaft 18a. The second output gear 22a is arranged on the second countershaft 18a. The second output gear 22a is designed as a second final drive gear. The second output gear 22a is designed as a spur gear. The second output gear 22a is designed as an idler wheel. The hybrid dual-clutch transmission 10a comprises a dual clutch 24a, which has a first clutch 26a assigned to the first sub-transmission 12a, and a second clutch 28a assigned to the second sub-transmission 14a. The hybrid dual-clutch transmission 10a comprises a separating clutch 30a. The hybrid dual-clutch transmission 10a comprises an electric motor 32a. An input side of the electric motor 32a is coupled to an output side of the separating clutch 30a and an output side of the electric motor 32a is or can be coupled to an input side of the dual clutch 24a. The electric motor 32a is provided to be operated at a voltage of 12V or 48V. The electric motor 32a has a stator 34a and a rotor 36a. The stator 34a is fixed to the housing. The rotor 36a is non-rotatably connected to the input side of the dual clutch 24a.

The hybrid dual-clutch transmission 10a is provided for use in a vehicle (not depicted in more detail). The vehicle is designed as a motor vehicle. The vehicle comprises the hybrid dual-clutch transmission 10a. The vehicle can be driven by means of the electric motor 32a and by means of an internal combustion engine of the vehicle which is not depicted in more detail. The vehicle is designed as a plug-in hybrid vehicle, for example (PHEV). The separating clutch 30a is provided to decouple the hybrid dual-clutch transmission 10a from the internal combustion engine, in particular a crankshaft 38a of the internal combustion engine. The first output gear 20a and the second output gear 22a are or can be coupled to an axle transmission 40a of the vehicle. Advantageously, the first output gear 20a and the second output gear 22a are engaged with an axle transmission input gear 66a of the axle transmission 40a.

The hybrid dual-clutch transmission 10a has a transmission input shaft 42a. The transmission input shaft 42a is designed as a solid shaft. The transmission input shaft 42a is non-rotatably connected to the dual clutch 24a and the separating clutch 30a. The electric motor 32a, in particular the rotor 36a of the electric motor 32a, is non-rotatably connected to the transmission input shaft 42a. The transmission input shaft 42a is arranged axially in parallel and axially offset to the first countershaft 16a and the second countershaft 18a.

Even more advantageously, although not depicted further here, the rotor 36a can also be arranged axially offset to the transmission input shaft 42a and, for example, coupled to the transmission input shaft 42a via a further spur gear step. It is important in the context of the invention that the rotor 36a is coupled to the transmission input shaft 42a in such a way that torques emanating from the rotor 36a are introduced into the input side of the dual clutch 24a via the transmission input shaft 42a.

With respect to a torque flow, the crankshaft 38a, the separating clutch 30a, the transmission input shaft 42a, the dual clutch 24a, the two sub-transmissions 12a, 14a and the axle transmission 40a are arranged in succession in the order mentioned.

When viewed in an axial direction, that is, when viewed in a direction along the transmission input shaft 42a, the crankshaft 38a, the separating clutch 30a, the transmission input shaft 42a, the dual clutch 24a, the second output gear 22a, the second sub-transmission 14a and the first sub-transmission 12a are arranged in succession in the order mentioned.

The second sub-transmission 14a is arranged axially adjacent to the first output gear 20a and the second output gear 22a. The first sub-transmission 12a is arranged on a side of the second sub-transmission 14a facing away from the first output gear 20a and the second output gear 22a. The dual clutch 24a is arranged axially between the first output gear 20a and the electric motor 32a. The dual clutch 24a is arranged on a side of the second sub-transmission 14a facing towards the first output gear 20a and the second output gear 22a. The electric motor 32a is arranged on a side of the dual clutch 24a facing away from the first output gear 20a and the second output gear 22a.

The first sub-transmission 12a has a first input shaft 44a. The second sub-transmission 14a has a second input shaft 46a. The first input shaft 44a is arranged coaxially with the second input shaft 46a. The first input shaft 44a is designed as a solid shaft. The second input shaft 46a is designed as a hollow shaft. The first input shaft 44a is arranged axially in parallel and axially offset to the first countershaft 16a and the second countershaft 18a. The first input shaft 44a can be non-rotatably connected to the first clutch 26a. The first input shaft 44a can be coupled non-rotatably to the transmission input shaft 42a by means of the first clutch 26a. The second input shaft 46a is non-rotatably connected to the second clutch 28a. The second input shaft 46a can be coupled non-rotatably to the transmission input shaft 42a by means of the second clutch 28a. The electric motor 32a is arranged coaxially with the first input shaft 44a of the first sub-transmission 12a and the second input shaft 46a of the second sub-transmission 14a. The electric motor 32a is arranged coaxially with the transmission input shaft 42a.

The first sub-transmission 12a has exactly four switchable spur gear pairs, which are arranged on exactly two wheel planes E1a, E2a designed as double wheel planes. The second sub-transmission 14a has exactly three switchable spur gear pairs, which are arranged on exactly three wheel planes E3a, E4a, E5a designed as single wheel planes. The hybrid dual-clutch transmission 10a comprises exactly five gear planes, which are formed by the two wheel planes E1a, E2a designed as double gear planes and the three wheel planes E3a, E4a, E5a designed as single wheel planes. The exactly five gearwheel planes are formed by a first wheel plane E1a, a second wheel plane E2a, a third wheel plane E3a, a fourth wheel plane E4a and a fifth wheel plane E5a. The hybrid dual-clutch transmission 10a comprises an output gear plane Z1a. The first output gear 20a and the second output gear 22a are arranged at least substantially in the output gear plane Z1a.

The first sub-transmission 12a has a first drive gear A1a and a second drive gear A2a. The second sub-transmission 14a has a third drive gear A3a, a fourth drive gear A4a and a fifth drive gear A5a. The first sub-transmission 12a has a first gearwheel G1a, in particular a reverse gearwheel. The first gearwheel G1a, in particular the reverse gearwheel, is arranged on the second wheel plane E2a. The first gearwheel G1a, in particular the reverse gearwheel, is not meshed with any drive gear. The first gearwheel G1a, in particular the reverse gearwheel, is arranged on the first countershaft 16a. The first gearwheel G1a, in particular the reverse gear wheel, is designed as a spur gear. The first gearwheel G1a, in particular the reverse gear wheel, is designed as an idler wheel. The second sub-transmission 14a has a second gearwheel G2a. The second gearwheel G2a of the second sub-transmission 14a is arranged on the fifth wheel plane E5a. The second gearwheel G2a is meshed with the fifth drive gear A5a. The second gearwheel G2a is arranged on the first countershaft 16a. The second gearwheel G2a is designed as a spur gear. The second gearwheel G2a is designed as an idler wheel. The first sub-transmission 12a has a third gearwheel G3a. The third gearwheel G3a of the first sub-transmission 12a is arranged on the second wheel plane E2a. The third gearwheel G3a is meshed with the second drive gear A2a. The third gearwheel G3a is arranged on the second countershaft 18a. The third gearwheel G3a is designed as a spur gear. The third gearwheel G3a is designed as an idler wheel. The first gearwheel G1a, in particular the reverse gearwheel, of the first sub-transmission 12a is meshed with the third gearwheel G3a of the first sub-transmission 12a. The second sub-transmission 14a has a fourth gearwheel G4a. The fourth gearwheel G4a of the second sub-transmission 14a is arranged on the fourth wheel plane E4a. The fourth gearwheel G4a is meshed with the fourth drive gear A4a. The fourth gearwheel G4a is arranged on the second countershaft 18a. The fourth gearwheel G4a is designed as a spur gear. The fourth gearwheel G4a is designed as an idler wheel. The first sub-transmission 12a has a fifth gearwheel G5a. The fifth gearwheel G5a of the first sub-transmission 12a is arranged on the first wheel plane E1a. The fifth gearwheel G5a is meshed with the first drive gear A1a. The fifth gearwheel G5a is arranged on the first countershaft 16a. The fifth gearwheel G5 is designed as a spur gear. The fifth gearwheel G5a is designed as an idler wheel. The second sub-transmission 14a has a sixth gearwheel G6a. The sixth gearwheel G6a of the second sub-transmission 14a is arranged in the third wheel plane E3a. The sixth gearwheel G6a is meshed with the third drive gear A3a. The sixth gearwheel G6a is arranged on the first countershaft 16a. The sixth gearwheel G6a is designed as a spur gear. The sixth gearwheel G6a is designed as an idler wheel. The first sub-transmission 12a has a seventh gearwheel G7a. The seventh gearwheel G7a of the first sub-transmission 12a is arranged in the first wheel plane E1a. The seventh gearwheel G7a is meshed with the first drive gear A1a. The seventh gearwheel G7a is arranged on the second countershaft 18a. The seventh gearwheel G7a is designed as a spur gear. The seventh gearwheel G7a is designed as an idler wheel.

The second gearwheel G2a of the second sub-transmission 14a is arranged axially between the first output gear 20a and the fourth gearwheel G4a of the second sub-transmission 14a. The fourth gearwheel G4a of the second sub-transmission 14a is arranged axially between the second gearwheel G2a of the second sub-transmission 14a and the sixth gearwheel G6a of the second sub-transmission 14a. The fifth gearwheel G5a of the first sub-transmission 12a and the seventh gearwheel G7a of the first sub-transmission 12a are arranged on one of the two wheel planes E1a, E2a formed as double wheel planes. The fifth gearwheel G5a of the first sub-transmission 12a and the seventh gearwheel G7a of the first sub-transmission 12a are arranged on the first wheel plane E1a. The first gearwheel G1a, in particular the reverse gearwheel, of the first sub-transmission 12a and the third gearwheel G3a of the first sub-transmission 12a are arranged on the second wheel plane E2a.

The first sub-transmission 12a comprises exactly four switch elements S1a, S3a, S5a, S7a. The first sub-transmission 12a comprises a first switch element S1a, a third switch element S3a, a fifth switch element S5a and a seventh switch element S7a. The first switch element S1a is provided to switch the first gearwheel G1a, in particular the reverse gearwheel. The third switch element S3a is provided to switch the third gearwheel G3a. The fifth switch element S5a is provided to switch the fifth gearwheel G5a. The seventh switch element S7a is provided to switch the seventh gearwheel G7a. The exactly four switch elements S1a, S3a, S5a, S7a of the first sub-transmission 12a form two double switch elements 48a, 50a. The first switch element S1a and the fifth switch element S5a form a first double switch element 48a. The first double switch element 48a is arranged axially between the two wheel planes E1a, E2a, which are designed as double wheel planes. The first double switch element 48a is provided to switch either the first gearwheel G1a, in particular the reverse gear wheel, or the fifth gearwheel G5a. The first double switch element 48a is provided to be actuated by a first shift fork (not depicted in more detail) of the first sub-transmission 12a. The third switch element S3a and the seventh switch element S7a form a second double switch element 50a. The second double switch element 50a is arranged axially between the two wheel planes E1a, E2a, which are formed by the two double wheel planes. The second double switch element 50a is provided to switch either the third gearwheel G3a or the seventh gearwheel G7a. The second double switch element 50a is provided to be actuated by a second shift fork (not depicted in more detail) of the first sub-transmission 12a. The second sub-transmission 14a comprises exactly three switch elements S2a, S4a, S6a. The second sub-transmission 14a comprises a second switch element S2a, a fourth switch element S4a and a sixth switch element S6a. The second switch element S2a is provided to switch the second gearwheel G2a. The fourth switch element S4a is provided to switch the fourth gearwheel G4a. The sixth switch element S6a is provided to switch the sixth gearwheel G6a. The second switch element S2a and the sixth switch element S6a form a third double switch element 52a. The third double switch element 52a is arranged axially between the third wheel plane E3a and the fifth wheel plane E5a. The third double switch element 52a is provided to switch either the second gearwheel G2a or the sixth gearwheel G6a. The third double switch element 52a is provided to be actuated by a third shift fork, which is not depicted in more detail, of the second sub-transmission 14a.

The hybrid dual-clutch transmission 10a comprises an output switch element S8a. The output switch element S8a is provided to switch the second output gear 22a. The output switch element S8a is arranged axially between the fourth gearwheel G4a of the second sub-transmission 14a and the second output gear 22a. The output switch element S8a is provided in at least one operating condition to decouple the second output gear 22a from the second countershaft 18a, wherein the second countershaft 18a is provided to provide at least one winding-path gear. The hybrid dual-clutch transmission 10a comprises a total of exactly eight switch elements, in particular the exactly four switch elements S1a, S3a, S5a, S7a of the first sub-transmission 12a, the exactly three switch elements S2a, S4a, S6a of the second sub-transmission 14a, and the output switch element S8a. The second sub-transmission 14a has a synchronizer body 54a, which can be actuated by a switch element, in particular the fourth switch element S4a, of the second sub-transmission 14a and by the output switch element S8a. The synchronizer body 54a is designed as a ganging body. The synchronizer body 54a is non-rotatably connected to the second countershaft 18a. The synchronizer body 54a is coupled to the fourth switch element S4a and to the output switch element S8a. By means of the synchronizer body 54a, in at least one operating state, a speed of the fourth gearwheel G4a and/or of the second output gear 22a is matched to a speed of the second countershaft 18a. The synchronizer body 54a is coupled to the output switch element S8a and the fourth switch element S4a. The synchronizer body 54a can be coupled non-rotatably to the second output gear 22a and coupled non-rotatably to the fourth gearwheel G4a. The output switch element S8a and the fourth switch element S4a form a fourth double switch element 56a. The fourth double switch element 56a is arranged axially between the fourth wheel plane E4a and the output gear plane Z1a. The fourth double switch element 56a is provided to switch the fourth gearwheel G4a and the second output gear 22a. The fourth double switch element is provided to be actuated by a fourth shift fork, which is not depicted in more detail, of the second sub-transmission 14a and an output shift fork, which is not depicted in more detail, of the hybrid dual-clutch transmission 10a. The fourth switch element S4a is coupled to the fourth shift fork. The output switch element S8a is coupled to the output shift fork. The fourth switch fork and the output shift fork can be actuated separately.

The fourth double switch element 56a has a first sliding sleeve 62a assigned to the output switch element S8a and a second sliding sleeve 64a assigned to the fourth switch element S4a.

Advantageously, an outer diameter of the first sliding sleeve 62a is smaller than a root diameter of the second output gear 22a. In addition, the output switch element S8a is advantageously arranged between the second output gear 22a and the second sub-transmission 14a as viewed in the axial direction.

The first sliding sleeve 62a and the second sliding sleeve 64a can be actuated separately.

Particularly advantageously, although not directly apparent from the schematic depiction in FIG. 1, the first sliding sleeve 62a is arranged at least partially axially overlapping with a toothing of the axle transmission input gear 66a. By "axially overlapping", it is meant that the first sliding sleeve 62a, seen in the axial direction, is arranged at least partially overlapping with the toothing of the axle transmission input gear 66a. Thus, the axle transmission input gear 66a and the first sliding sleeve 62a, seen in the axial direction, are arranged at least partially in the same axial region, which contributes overall to an axially compact arrangement of the hybrid dual-clutch transmission 10a.

Advantageously, the first sliding sleeve 62a and the second sliding sleeve 64a are arranged on the synchronizer body 54a. The first sliding sleeve 62a and the second sliding sleeve 64a are arranged axially overlapping and coaxially with the synchronizer body 54a.

Furthermore, an axial extension of a toothing of the second output gear 22a is advantageously substantially smaller than an axial extension of a toothing of the first output gear 20a. In this way, the second output gear 22a and the first sliding sleeve 62a fit at least to a large extent "under" the axle transmission input gear 66a. Both the second output gear 22a and the first sliding sleeve 62a are arranged at least partially axially overlapping with the axle transmission input gear 66a.

Particularly advantageously, a differential cage 68a of the axle transmission 40a is arranged at least partially axially overlapping with the dual clutch 24a, wherein the output gear plane Z1a is arranged between the dual clutch 24a and the second sub-transmission 14a as viewed in the axial direction. Advantageously, the dual clutch 24a, the output gear plane Z1a, the second sub-transmission 14a and the first sub-transmission 12a are arranged one after the other in the order mentioned above, when viewed in the axial direction. The axle transmission input gear 66a is arranged on the output gear plane Z1a.

It has been found that a totality of the following features represents a particularly advantageous compromise between, on the one hand, a design that is as compact as possible and, on the other hand, a transmission function that is as high-performance as possible:
 the second output gear 22a has a larger diameter than the first output gear 20a,
 seen in the axial direction, the dual clutch 24a, the output gear plane Z1a, the fifth wheel plane E5a assigned to a second forward gear V2a, the fourth wheel plane E4a assigned to a fourth forward gear V4a, the third wheel plane E3a assigned to a sixth forward gear V6a as well as the first sub-transmission 12a for odd gears are arranged in succession in the order mentioned above,
 the output switch element S8a is arranged axially between the output gear plane Z1e and the fourth wheel plane E4e,
 the differential cage 68a is arranged at least partially axially overlapping with the dual clutch 24a,
 the second switch element S2a for switching the second gearwheel G2a and the sixth switch element S6a for switching the sixth gearwheel G6a are arranged axially between the fifth wheel plane E5a and the third wheel plane E3a.

A circuit diagram 58a of the hybrid dual-clutch transmission 10a is shown in FIG. 2. The hybrid dual-clutch transmission 10a has seven forward gears V1a, V2a, V3a, V4a, V5a, V6a, V7a. The hybrid dual-clutch transmission 10a has two reverse gears R1a, R2a. The circuit diagram 58a shows how the forward gears V1a, V2a, V3a, V4a, V5a, V6a, V7a or the reverse gears R1a, R2a can be switched by closing the clutches 26a, 28a and the switch elements S1a, S2a, S3a, S4a, S5a, S6a, S7a.

In a first forward gear V1a, a power flow runs from the transmission input shaft 42a via the first clutch 26a, wherein the first clutch 26a is closed, via the third gearwheel G3a, wherein the third switch element S3a is closed, via the fourth gearwheel G4a, wherein the fourth switch element S4a is closed, and via the second gearwheel G2a, wherein the second switch element S2a is closed, to the first output gear 20a. In the first forward gear V1a, the output switch element S8a is opened, wherein the second output gear 22a is rotatably mounted relative to the second countershaft 18a.

In the second forward gear V2a, a power flow runs from the transmission input shaft 42a via the second clutch 28a, wherein the second clutch 28a is closed, and via the second gearwheel G2a, wherein the second switch element S2a is closed, to the first output gear 20a. In the second forward gear V2a, the output switch element S8a is opened, wherein the second output gear 22a is rotatably mounted relative to the second countershaft 18a.

In a third forward gear V3a, a power flow runs from the transmission input shaft 42a via the first clutch 26a, wherein the first clutch 26a is closed, and via the third gearwheel G3a, wherein the third switch element S3a is closed, to the second output gear 22a. In the third forward gear V3a, the output switch element S8a is closed, wherein the second output gear 22a is non-rotatably mounted relative to the second countershaft 18a.

In the fourth forward gear V4a, a power flow runs from the transmission input shaft 42a via the second clutch 28a, wherein the second clutch 28a is closed, and via the fourth gearwheel G4a, wherein the fourth switch element S4a is closed, to the second output gear 22a. In the fourth forward gear V4a, the output switch element S8a is closed, wherein the second output gear 22a is non-rotatably mounted relative to the second countershaft 18a.

In a fifth forward gear V5a, a power flow runs from the transmission input shaft 42a via the first clutch 26a, wherein the first clutch 26a is closed, and via the fifth gearwheel G5a, wherein the fifth switch element S5a is closed, to the first output gear 20a. In the fifth forward gear V5a, the output switch element S8a is opened, wherein the second output gear 22a is rotatably mounted relative to the second countershaft 18a.

In the sixth forward gear V6a, a power flow runs from the transmission input shaft 42a via the second clutch 28a, wherein the second clutch 28a is closed, and via the sixth gearwheel G6a, wherein the sixth switch element S6a is closed, to the first output gear 20a. In the sixth forward gear V6a, the output switch element S8a is opened, wherein the second output gear 22a is rotatably mounted relative to the second countershaft 18a.

In a seventh forward gear V7a, a power flow runs from the transmission input shaft 42a via the first clutch 26a, wherein the first clutch 26a is closed, and via the seventh gearwheel G7a, wherein the seventh switch element S7a is closed, to the second output gear 22a. In the seventh forward gear V7a, the output switch element S8a is closed, wherein the second output gear 22a is non-rotatably mounted relative to the second countershaft 18a.

In a first reverse gear R1a, a power flow runs from the transmission input shaft 42a via the second clutch 28a, wherein the second clutch 28a is closed, via the fourth gearwheel G4a, wherein the fourth switch element S4a is closed, via the seventh gearwheel G7a, wherein the seventh switch element S7a is closed, via the third gearwheel G3a, wherein the third switch element S3a is opened, and via the first gearwheel G1a, wherein the switch element S1a is closed, to the first output gear 20a. In the first reverse gear R1a, the output switch element S8a is opened, wherein the second output gear 22a is rotatably mounted relative to the second countershaft 18a.

In a second reverse gear R2a, a power flow runs from the transmission input shaft 42a via the first clutch 26a, wherein the first clutch 26a is closed, via the third gearwheel G3a, wherein the third switch element S3a is open, and via the first gearwheel G1a, wherein the switch element S1a is closed, to the first output gear 20a. In the second reverse gear R2a, the output switch element S8a is opened, wherein the second output gear 22a is rotatably mounted relative to the second countershaft 18a.

An optional eighth forward gear V8a, which has a very small transmission ratio and can be used as a ninth forward gear in the exemplary embodiment in FIG. 6, can be formed via the first clutch 26a, further via the seventh switch element S7a and the seventh gearwheel G7a, further via the fourth switch element S4a and the fourth gearwheel G4a, further via the sixth switch element S6a and the sixth gearwheel G6a and finally via the first output gear 20a.

In FIGS. 3 to 7, three further exemplary embodiments of the invention are shown. The following descriptions and the drawings are substantially limited to the differences between the exemplary embodiments, wherein with regard to identically designated components, in particular with regard to components with the same reference numerals, reference can in principle also be made to the drawings and/or the description of the other exemplary embodiments, in particular FIGS. 1 and 2. In order to differentiate between the exemplary embodiments, the letter a is placed after the reference numeral of the exemplary embodiment in FIGS. 1 and 2. In the exemplary embodiments in FIGS. 3 to 7, the letter a is replaced by the letters b to f.

FIG. 3 shows a hybrid dual-clutch transmission 10b in a second exemplary embodiment. The hybrid dual-clutch transmission 10b comprises a first sub-transmission 12b and a second sub-transmission 14b. The hybrid dual-clutch transmission 10b comprises a first countershaft 16b. The hybrid dual-clutch transmission 10b comprises a second countershaft 18b. The hybrid dual-clutch transmission 10b comprises a first output gear 20b which is non-rotatably connected to the first countershaft 16b. The hybrid dual-clutch transmission 10b comprises a second output gear 22b, which is rotatably mounted on the second countershaft 18b. The hybrid dual-clutch transmission 10b comprises a dual clutch 24b, which has a first clutch 26b assigned to the first sub-transmission 12b and a second clutch 28b assigned to the second sub-transmission 14b. The hybrid dual-clutch transmission 10b comprises a separating clutch 30b. The hybrid dual-clutch transmission 10b comprises an electric motor 32b. The electric motor 32b has a stator 34b and a rotor 36b. The hybrid dual-clutch transmission 10b is provided for use in a vehicle (not depicted in more detail). The separating clutch 30b is provided to decouple the hybrid dual-clutch transmission 10b from an internal combustion engine of the vehicle (not shown in more detail), in particular a crankshaft 38b of the internal combustion engine. The first output gear 20b and the second output gear 22b are or can be coupled to an axle transmission 40b of the vehicle. The hybrid dual-clutch transmission 10b has a transmission input shaft 42b. The electric motor 32b is arranged axially in parallel and axially offset from the transmission input shaft 42b. The electric motor 32b is connected to the transmission input shaft 42b by means of a non-switchable spur gear pair 60b. An output side of the electric motor 32b is coupled to the dual clutch 24b via the non-switchable spur gear pair 60b. The rotor 36b of the electric motor 32b is coupled to the non-switchable spur gear pair 60b. The separating clutch 30b is arranged axially between the dual clutch 24b and the electric motor 32b. The first sub-transmission 12b has a first input shaft 44b. The second sub-transmission 14b has a second input shaft 46b. The first sub-transmission 12b has exactly four switchable spur gear pairs, which are arranged on exactly two double wheel planes E1b, E2b. The second sub-transmission 14b has exactly three switchable spur gear pairs, which are arranged on exactly three wheel planes E3b, E4b, E5b designed as single wheel planes. The hybrid dual-clutch transmission 10b comprises exactly five gearwheel planes, which are formed by the two wheel planes E1b, E2b designed as double wheel planes, and the three wheel planes E3b, E4b, E5b designed as single wheel planes. The exactly five gearwheel planes are formed by a first wheel plane E1b, a second wheel plane E2b, a third wheel plane E3b, a fourth wheel plane E4b and a fifth wheel plane E5b. The hybrid dual-clutch transmission 10b comprises an output gear plane Z1b. The first sub-transmission 12b has a first drive gear A1b and a second drive gear A2b. The second sub-transmission 14b has a third drive gear A3b, a fourth drive gear A4b and a fifth drive gear A5b. The first sub-transmission 12b has a first gearwheel G1b, in particular a reverse gearwheel. The second sub-transmission 14b has a second gearwheel G2b. The first sub-transmission 12b has a third gearwheel G3b. The second sub-transmission 14b has a fourth gearwheel G4b. The first sub-transmission 12b has a fifth gearwheel G5b. The second sub-transmission 14b has a sixth gearwheel G6b. The first sub-transmission 12b has a seventh gearwheel G7b. The first sub-transmission 12b comprises exactly four switch elements S1b, S3b, S5b, S7b. The first sub-transmission 12b comprises a first switch element S1b, a third switch element S3b, a fifth switch element S5b and a seventh switch element S7b. The exactly four switch elements S1b, S3b, S5b, S7b of the first sub-transmission 12b form two double switch elements 48b, 50b. The first switch element S1b and the fifth switch element S5b form a first double switch element 48b. The third switch element and the seventh switch element S7b form a second double switch element 50b. The second sub-transmission 14b comprises exactly three switch elements S2b, S4b, S6b. The second sub-transmission 14b comprises a second switch element S2b, a fourth switch element S4b and a sixth switch element S6b. The second switch element S2b and the sixth switch element S6b form a third double switch element 52b. The hybrid dual-clutch transmission 10b comprises an output switch element S8b. A switch element, in particular the fourth switch element S4b, of the second sub-transmission 14b is arranged axially between the fourth gearwheel G4b of the second sub-transmission 14b and the third gearwheel G3b of the first sub-transmission 12b. The fourth switch element S4b of the second sub-transmission 14b is arranged axially between the fourth gearwheel G4b of the second sub-transmission 14b and the third gearwheel G3b of the first sub-transmission 12b. In this way, the fourth switch element S4b and the output switch element S8b do not form a double switch element. The fourth switch element S4b is arranged at least substantially on the third wheel plane E3b.

FIG. 4 shows a hybrid dual-clutch transmission 10c in a third exemplary embodiment. The hybrid dual-clutch transmission 10c comprises a first sub-transmission 12c and a second sub-transmission 14c. The hybrid dual-clutch transmission 10c comprises a first countershaft 16c. The hybrid dual-clutch transmission 10c comprises a second countershaft 18c. The hybrid dual-clutch transmission 10c comprises a first output gear 20c, which is non-rotatably connected to the first countershaft 16c. The hybrid dual-clutch transmission 10c comprises a second output gear 22c rotatably mounted on the second countershaft 18c. The hybrid dual-clutch transmission 10c comprises a dual clutch 24c, which has a first clutch 26c assigned to the first sub-transmission 12c and a second clutch 28c assigned to the second sub-transmission 14c. The dual clutch 24c is arranged axially on a side of the first sub-transmission 12c facing away from the second sub-transmission 14c. The hybrid dual-clutch transmission 10c comprises a separating clutch 30c. The hybrid dual-clutch transmission 10c comprises an electric motor 32c. The electric motor 32c has a stator 34c and a rotor 36c. The first sub-transmission 12c, the second sub-transmission 14c, the first output gear 20c and the second output gear 22c are arranged axially between the dual clutch 24c and the electric motor 32c. The hybrid dual-clutch transmission 10c is provided for use in a vehicle (not depicted in more detail). The separating clutch 30c is provided to decouple the hybrid dual-clutch transmission 10c from an internal combustion engine of the vehicle (not depicted in more detail), in particular a crankshaft 38c of the internal combustion engine. The first output gear 20c and the second output gear 22c are or can be coupled to an axle transmission 40c of the vehicle. The hybrid dual-clutch transmission 10c has a transmission input shaft 42c. The electric motor 32c is arranged coaxially with the transmission input shaft 42c. The electric motor 32c is arranged axially between the second sub-transmission 14c and the separating clutch 30c. The first sub-transmission 12c has a first input shaft 44c. The first input shaft 44c is designed as a hollow shaft. The second sub-transmission 14c has a second input shaft 46c. The second input shaft 46c is designed as a hollow shaft. The electric motor 32c is arranged coaxially with the first input shaft 44c of the first sub-transmission 12c and the second input shaft 46c of the second sub-transmission 14c. The first sub-transmission 12c has exactly four switchable spur gear pairs arranged on exactly two wheel planes E1c, E2c, which are designed as double wheel planes. The second sub-transmission 14c has exactly three switchable spur gear pairs arranged on exactly three wheel planes E3c, E4c, E5c which are designed as single wheel planes. The hybrid dual-clutch transmission 10c comprises exactly five gearwheel planes, which are formed by the two wheel planes E1c, E2c designed as double wheel planes and the three wheel planes E3c, E4c, E5c designed as single wheel planes. The exactly five gearwheel planes are formed by a first wheel plane E1c, a second wheel plane E2c, a third wheel plane E3c, a fourth wheel plane E4c and a fifth wheel plane E5c. The hybrid dual-clutch transmission 10c comprises an output gear plane Z1c. The first sub-transmission 12c has a first drive gear A1c and a second drive gear A2c. The second sub-transmission 14c has a third drive gear A3c, a fourth drive gear A4c and a fifth drive gear A5c. The first sub-transmission 12c has a first gearwheel G1c, in particular a reverse gearwheel. The second sub-transmission 14c has a second gearwheel G2c. The first sub-transmission 12c has a third gearwheel G3c. The second sub-transmission 14c has a fourth gearwheel G4c. The first sub-transmission 12c has a fifth gearwheel G5c. The second sub-transmission 14c has a sixth gearwheel G6c. The first sub-transmission 12c has a seventh gearwheel G7c. The first sub-transmission 12c comprises exactly four switch elements S1c, S3c, S5c, S7c. The first sub-transmission 12c comprises a first switch element S1c, a third switch element S3c, a fifth switch element S5c and a seventh switch element S7c. The exactly four switch elements S1c, S3c, S5c, S7c of the first sub-transmission 12c form two double switch elements 48c, 50c. The first switch element S1c and the fifth switch element S5c form a first double switch element 48c. The third switch element S3c and the seventh switch element S7c form a second double switch element 50c. The second sub-transmission 14c comprises exactly three switch elements S2c, S4c, S6c. The second sub-transmission 14c comprises a second switch element S2c, a fourth switch element S4c and a sixth switch element S6c. The second switch element S2c and the sixth switch element S6c form a third double switch element 52c. The hybrid dual-clutch transmission 10c comprises an output switch element S8c. The second sub-transmission 14c has a synchronizer body 54c, which can be actuated by a switch element, in particular the fourth switch element S4c, of the second sub-transmission 14c and by the output switch element S8c. The output switch element S8c and the fourth switch element S4c form a fourth double switch element 56c. The fourth double switch element 56c is arranged axially between the fourth wheel plane E4c and the output gear plane Z1c. The fourth double switch element 56c is provided to switch the fourth gearwheel G4c and/or the second output gear 22c.

FIG. 5 shows a hybrid dual-clutch transmission 10d in a fourth exemplary embodiment. The hybrid dual-clutch transmission 10d comprises a first sub-transmission 12d and a second sub-transmission 14d. The hybrid dual-clutch transmission 10d comprises a first countershaft 16d. The hybrid dual-clutch transmission 10d comprises a second countershaft 18d. The hybrid dual-clutch transmission 10d comprises a first output gear 20d, which is non-rotatably connected to the first countershaft 16d. The hybrid dual-clutch transmission 10d comprises a second output gear 22d which is rotatably mounted on the second countershaft 18d. The hybrid dual-clutch transmission 10d comprises a dual clutch 24d, which has a first clutch 26d assigned to the first sub-transmission 12d and a second clutch 28d assigned to the second sub-transmission 14d. The dual clutch 24d is arranged axially on a side of the first sub-transmission 12d facing away from the second sub-transmission 14d. The hybrid dual-clutch transmission 10d comprises a separating clutch 30d. The hybrid dual-clutch transmission 10d an electric motor 32d. The electric motor 32d has a stator 34d and a rotor 36d. The electric motor 32d is arranged on a side of the dual clutch 24d facing away from the first sub-transmission 12d. The dual clutch 24d, the first sub-transmission 12d, the second sub-transmission 14d, the first output gear 20d and the second output gear 22d are arranged axially between the electric motor 32d and the separating clutch 30d. The hybrid dual-clutch transmission 10d is provided for use in a vehicle (not depicted in more detail). The separating clutch 30d is provided to decouple the hybrid dual-clutch transmission 10d from an internal combustion engine of the vehicle) not depicted in more detail), in particular a crankshaft 38d of the internal combustion engine. The first output gear 20d and the second output gear 22d are or can be coupled to an axle transmission 40d of the vehicle. The hybrid dual-clutch transmission 10d has a transmission input shaft 42d. The electric motor 32d is arranged coaxially with the transmission input shaft 42d. The electric motor 32d is arranged axially between the second sub-transmission 14d and the separating clutch 30d. The first sub-transmission 12d has a first input shaft 44d. The first input shaft 44d is designed as a hollow shaft. The second sub-transmission 14d has a second input shaft 46d. The second input shaft 46d is designed as a hollow shaft. The electric motor 32d is arranged coaxially with the first input shaft 44d of the first sub-transmission 12d and the second input shaft 46d of the second sub-transmission 14d. The first sub-transmission 12d has exactly four switchable spur gear pairs, which are arranged on exactly two wheel planes E1d, E2d designed as double wheel planes. The second sub-transmission 14d has exactly three switchable spur gear pairs, which are arranged on exactly three wheel planes E3d, E4d, E5d designed as single wheel planes. The hybrid dual-clutch transmission 10d comprises exactly five gearwheel planes, which are formed by the two wheel planes E1d, E2d designed as double wheel planes and the three wheel planes E3d, E4d, E5d designed as single wheel planes. The exactly five gearwheel planes are formed by a first wheel plane E1d, a second wheel plane E2d, a third wheel plane E3d, a fourth wheel plane E4d and a fifth wheel plane E5d. The hybrid dual-clutch transmission 10d comprises an output gear plane Z1d. The first sub-transmission 12d has a first drive gear A1d and a second drive gear A2d. The second sub-transmission 14d has a third drive gear A3d, a fourth drive gear A4d and a fifth drive gear A5d. The first sub-transmission 12d has a first first gearwheel G1d, in particular a reverse gearwheel. The second sub-transmission 14d has a second gearwheel G2d. The first sub-transmission 12d has a third gearwheel G3d. The second sub-transmission 14d has a fourth gearwheel G4d. The first sub-transmission 12d has a fifth gearwheel G5d. The second sub-transmission 14d has a sixth gearwheel G6d. The first sub-transmission 12d has a seventh gearwheel G7d. The first sub-transmission 12d comprises exactly four switch elements S1d, S3d, S5d, S7d. The first sub-transmission 12d comprises a first switch element S1d, a third switch element S3d, a fifth switch element S5d and a seventh switch element S7d. The exactly four switch elements S1d, S3d, S5d, S7d of the first sub-transmission 12d form two double switch elements 48d, 50d. The first switch element S1d and the fifth switch element S5d form a first double switch element 48d. The third switch element S3d and the seventh switch element S7d form a second double switch element 50d. The second sub-transmission 14d comprises exactly three switch elements S2d, S4d, S6d. The second sub-transmission 14d comprises a second switch element S2d, a fourth switch element S4d and a sixth switch element S6d. The second switch element S2d and the sixth switch element S6d form a third double switch element 52d. The hybrid dual-clutch transmission 10d comprises an output switch element S8d. The second sub-transmission 14d has a synchronizer body 54d, which can be actuated by a switch element, in particular the fourth switch element S4d, of the second sub-transmission 14d, and by the output switch element S8d. The output switch element S8d and the fourth switch element S4d form a fourth double switch element 56d. The fourth double switch element 56d is arranged axially between the fourth wheel plane E4d and the output gear plane Z1d. The fourth double switch element 56d is provided to switch the fourth gearwheel G4d and/or the second output gear 22d.

FIG. 6 shows a hybrid dual-clutch transmission 10e in a fifth exemplary embodiment. The fifth exemplary embodiment differs from the exemplary embodiments in FIGS. 1 to 5 mainly in that an eighth gearwheel G8e is provided, which is mounted as an idler wheel on the second countershaft 18e and is arranged coaxially with it. The eighth gearwheel G8e is assigned an eighth switch element S9e which is designed to non-rotatably connect the eighth gearwheel G8e to the second countershaft 18e. In this exemplary embodiment, the eighth switch element S9e is arranged adjacently to a fourth switch element S4e and combined with it to form a double switch element.

The eighth gearwheel G8e is arranged on a third wheel plane E3e. The third wheel plane E3e is designed as a double wheel plane in this fifth exemplary embodiment.

The hybrid dual-clutch transmission 10e is suitable for switching at least 8 sensibly stepped transmission forward gears. A ninth gear formed as a winding-path gear can be formed like the eighth forward gear V8a mentioned in FIG. 2.

In principle and generally speaking, the feature of the eighth gearwheel G8 can also be combined with the exemplary embodiments of FIGS. 1, 4 and 5, wherein the eighth switch element S9 assigned to the gearwheel G8 does not necessarily have to be assigned to a double switch element.

A further development, which is shown in the fifth exemplary embodiment but which can also be combined with all other exemplary embodiments of FIGS. 1 to 5 and 7, is the design of the output switch element S8. An output switch element S8e of the fifth exemplary embodiment has a first sliding sleeve 62e, which is designed in such a way that it is mounted in an axially displaceable manner on the second output gear 22e. The first sliding sleeve 62e is non-rotatably connected to the second output gear 22e in a neutral position and, together with the second output gear 22e, is rotatably mounted relative to the second countershaft 18e. The first sliding sleeve 62e is non-rotatably connected to the second output gear 22e in a switch position and also non-rotatably connected to the second countershaft 18e.

A differential cage 68e of an axle transmission 40e is arranged at least partially axially overlapping with a double clutch 24e, wherein an output gear plane Z1e is arranged between the dual clutch 24e and a second sub-transmission 14e, as viewed in the axial direction. In the fifth exemplary embodiment, the dual clutch 24e, the output gear plane Z1e, the second sub-transmission 14e and a first sub-transmission 12e are arranged one after the other in the above-mentioned order, as viewed in the axial direction. Here, an axle transmission input gear 66e is arranged in the output gear plane Z1e.

An electric motor 32e is thereby arranged axially offset from a transmission input shaft 42e.

It has been found that a totality of the following features represents a particularly advantageous compromise between, on the one hand, a design that is as compact as possible and, on the other hand, a transmission function that is as high-performance as possible:

a second output gear 22e has a larger diameter than a first output gear 20e, wherein the second output gear 22e can be non-rotatably connected to a second countershaft 18e by means of the output switch element S8e, viewed in the axial direction, the dual clutch 24e, the output gear plane Z1e, a fifth wheel plane E5e assigned to a second gear, a fourth wheel plane E4e assigned to a fourth gear, a third wheel plane E3e assigned to a sixth gear, and a first sub-transmission 12e for odd gears are arranged one after the other in the order mentioned above, the output switch element S8e is arranged axially between the output gear plane Z1e and the fourth wheel plane E4e, the differential cage 68e is arranged at least partially axially overlapping with the dual clutch 24e, a second switch element S2e for switching a second gearwheel G2e and a sixth switch element S6e for switching a sixth gearwheel G6e are arranged axially between the fifth wheel plane E5e and the third wheel plane E3e.

The particularly advantageous arrangement described by the above-mentioned features is further improved by the fact that a fourth switch element S4e for switching a fourth gearwheel G4e and an eighth switch element S9e for switching an eighth gearwheel G8e are arranged axially between the fourth wheel plane E4e and the third wheel plane E3e.

Furthermore, it is particularly advantageous that the electric motor 32e is arranged axially offset to the transmission input shaft 42e.

FIG. 7 shows a hybrid dual-clutch transmission 10f in a sixth exemplary embodiment. The sixth exemplary embodiment differs from the exemplary embodiments in FIGS. 1 to 5 mainly in that a first wheel plane E1f and a second wheel plane E2f of a first sub-transmission 12f are designed as single wheel planes.

The hybrid dual-clutch transmission 10f is suitable for switching 6 sensibly stepped transmission forward gears and is extremely compact. A special reverse gearwheel for a reverse drive with a drive starting from a crankshaft 38f is not provided in the sixth exemplary embodiment. However, an electric reverse drive with a drive starting from a rotor 36f is also possible here, as in all other exemplary embodiments.

A third switch element S3f, which is arranged coaxially with a second countershaft 18f and is assigned to the first sub-transmission 12f and which is provided for switching a third gearwheel G3f, is arranged axially overlapping with the first wheel plane E1f.

A fifth switch element S5f, which is arranged coaxially with that of a first countershaft 16f and is assigned to the first sub-transmission 12f and which is provided for switching a fifth gearwheel G5f, is arranged axially overlapping with the second wheel plane E2f.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE NUMERAL LIST 10 hybrid dual-clutch transmission
12 first sub-transmission
14 second sub-transmission
16 first countershaft
18 second countershaft
20 output gear
22 output gear
24 dual clutch
26 clutch
28 clutch
30 separating clutch
32 electric motor
34 stator
36 rotor
38 crankshaft
40 axle transmission
42 transmission input shaft
44 input shaft
46 input shaft
48 double switch element
50 double switch element
52 double switch element
54 synchronizer body
56 double switch element
58 circuit diagram
60 spur gear pair
62 first sliding sleeve
64 second sliding sleeve
66 axle transmission input gear
68 differential cage
A1 drive gear
A2 drive gear
A3 drive gear
A4 drive gear
A5 drive gear
E1 first wheel plane
E2 second wheel plane
E3 third wheel plane
E4 fourth wheel plane
E5 fifth wheel plane
G1 first gearwheel
G2 second gearwheel
G3 third gearwheel
G4 fourth gearwheel
G5 fifth gearwheel
G6 sixth gearwheel
G7 seventh gearwheel
G8 eighth gearwheel
R1 reverse gear
R2 reverse gear
S1 first switch element
S2 second switch element
S3 third switch element
S4 fourth switch element
S5 fifth switch element
S6 sixth switch element
S7 seventh switch element
S8 output switch element
S9 eighth switch element
V1 forward gear
V2 forward gear
V3 forward gear
V4 forward gear
V5 forward gear
V6 forward gear
V7 forward gear
Z1 output gear plane

What is claimed is:

1. A hybrid dual-clutch transmission, comprising:
a first sub-transmission;
a second sub-transmission;
a first countershaft;
a first output gear connected non-rotatably to the first countershaft;
a second countershaft;
a dual clutch, which has a first clutch assigned to the first sub-transmission and a second clutch assigned to the second sub-transmission;
a separating clutch;
a second output gear rotatably mounted on the second countershaft;
an output switch element configured for switching the second output gear, wherein the second output gear has a larger diameter than the first output gear; and
an electric motor, wherein a rotor of the electric motor is couplable to an output side of the separating clutch and to an input side of the dual clutch,
wherein a differential cage of an axle transmission is arranged at least partially axially overlapping with the dual clutch,
wherein a third gearwheel assigned to the first sub-transmission and a seventh gearwheel assigned to the first sub-transmission are arranged coaxially with the second countershaft,
wherein a first gearwheel assigned to the first sub-transmission is arranged coaxially with the first countershaft,
wherein, as viewed in an axial direction, the following are arranged one after another in the following order, the dual clutch, an output gear plane, a fifth wheel plane assigned to a second forward gear, a fourth wheel plane assigned to a fourth forward gear, a third wheel plane assigned to a sixth forward gear, and the first sub-transmission,
wherein the output switch element is arranged axially between the output gear plane and the fourth wheel plane, wherein a reverse gear is formed by a third gearwheel, which is arranged coaxially with the second countershaft, being arranged permanently meshing with a first gearwheel arranged coaxially with the first countershaft.

2. The hybrid dual-clutch transmission of claim 1, wherein a fifth gearwheel of the first sub-transmission and the seventh gearwheel of the first sub-transmission are arranged on a first wheel plane, which is a double wheel plane.

3. The hybrid dual-clutch transmission of claim 1, wherein the first sub-transmission comprises exactly four switch elements.

4. The hybrid dual-clutch transmission of claim 1, wherein an axial extension of a toothing of the second output gear is substantially smaller than an axial extension of a toothing of the first output gear.

5. The hybrid dual-clutch transmission of claim 1, wherein an outer diameter of a first sliding sleeve of the output switch element is smaller than a root diameter of the second output gear.

6. The hybrid dual-clutch transmission of claim 5, wherein the second sub-transmission has a synchronizer body, which can be non-rotatably coupled to the second output gear and can be non-rotatably coupled to a fourth gearwheel, wherein the first sliding sleeve and a second sliding sleeve are arranged coaxially and axially overlapping with the synchronizer body.

7. The hybrid dual-clutch transmission of claim 1, wherein a switch element of the second sub-transmission is arranged axially between the fourth gearwheel of the second sub-transmission and the third gearwheel of the first sub-transmission.

8. The hybrid dual-clutch transmission of claim 5, wherein the first sliding sleeve is non-rotatably connected to the second output gear in a neutral position and mounted in an axially displaceable manner on the second output gear.

9. The hybrid dual-clutch transmission of claim 5, wherein the first sliding sleeve is arranged at least partially axially overlapping with a toothing of an axle transmission input gear of an axle transmission.

* * * * *